June 24, 1941.  E. E. WEMP  2,246,769
CLUTCH
Filed Jan. 26, 1938  3 Sheets-Sheet 1
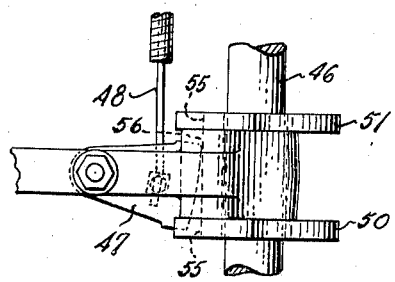
Fig. 8.
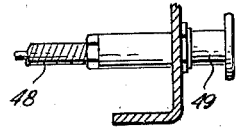
Fig. 1.
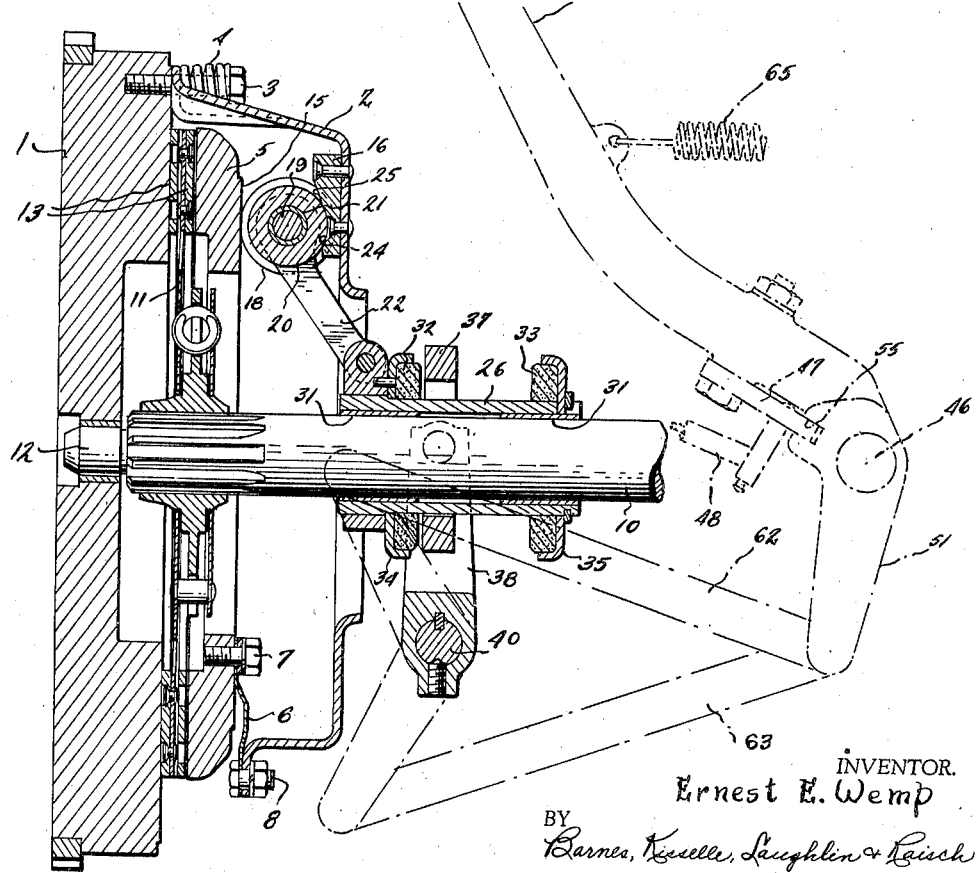
INVENTOR.
Ernest E. Wemp
BY Barnes, Kisselle, Laughlin & Raisch
ATTORNEYS June 24, 1941.  E. E. WEMP  2,246,769
CLUTCH
Filed Jan. 26, 1938   3 Sheets-Sheet 2
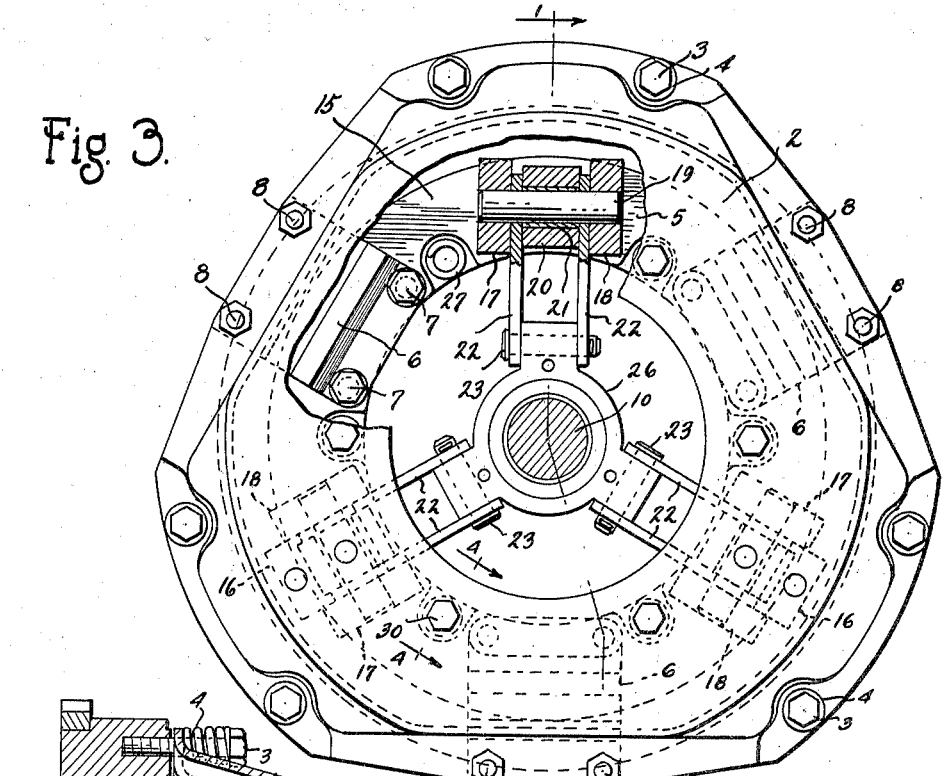
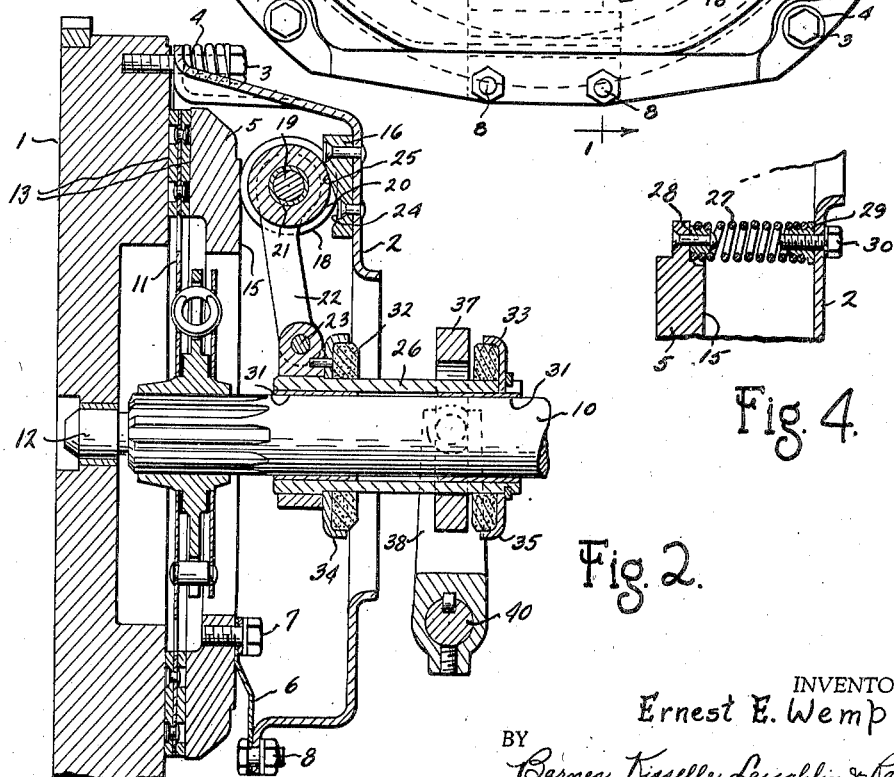
INVENTOR.
Ernest E. Wemp
BY Barnes, Kisselle, Laughlin & Reich
ATTORNEYS

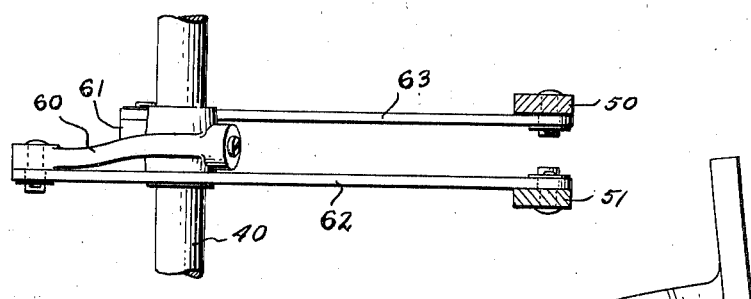
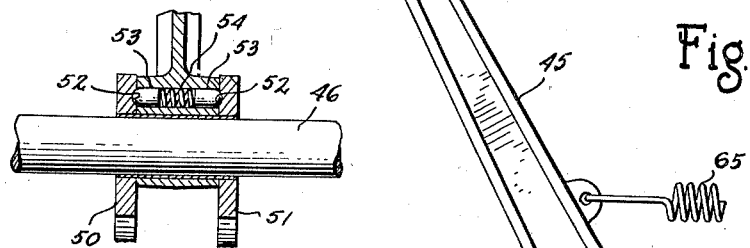
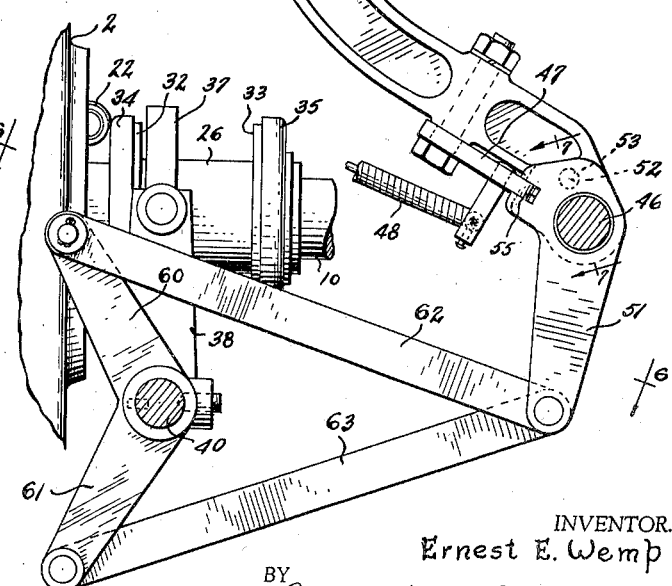

Patented June 24, 1941

2,246,769

UNITED STATES PATENT OFFICE 2,246,769

CLUTCH

Ernest E. Wemp, Detroit, Mich.

Application January 26, 1938, Serial No. 186,936

19 Claims. (Cl. 192—105)

This invention has to do with a clutch especially designed for use with automotive vehicles. It is directed particularly towards the provision of a clutch having certain automatic actions and wherein certain phases of the clutch operation may be manually controlled.

More particularly, the invention is directed toward the provision of a clutch of the centrifugal type which will automatically engage by centrifugal action. The clutch, however, is so arranged that once it is fully engaged, certain parts will assume a substantially locked position so that the clutch remains engaged even though decelerated to a stop. Automotive vehicles usually employ internal combustion engines, and it will be seen that with such a centrifugal clutch the engine may be stalled and brought to a complete stop. However, the clutch may be manually controlled for release when desired, and this is accomplished in the normal action of releasing the clutch with very little effort required on the part of the operator. The invention also aims to provide a clutch wherein the centrifugal members shift noiselessly and reach the ends of their movement without a bumping action and accompanying noises. A further aim of the invention is to provide a clutch wherein initial clutch engagement by centrifugal force takes place gradually and smoothly without a tendency to grab. The tendency of heretofore known centrifugal clutches is to engage quickly with a grabbing action, because upon acceleration some of the centrifugal force is dissipated in overcoming the inertia of the centrifugal weights. After the weight starts moving, the centrifugal force theretofore dissipated in overcoming inertia becomes a factor tending to move the weights centrifugally. Furthermore, as the weight moves outwardly on a gradually increasing radius, the centrifugal force becomes more effective. These things contribute to a clutch grabbing action or quick or sudden engagement where the clutch is to be automatically engaged by movement of weights under centrifugal force.

The invention aims to improve the clutch action by employing spring means acting against movement of the weight or weights centrifugally and wherein there is a definite coordinated relationship between the springs and the weights. More specifically, the rate of the resistance to flexure of the spring means is calculated to at least be equal to the rate of increase of the effective centrifugal force by reason of the increase in the radius. From a practical standpoint it is preferred that the spring rate be greater than the rate of increase of effective centrifugal force incident to the increase of the radius.

One construction for carrying out the invention is shown in the accompanying drawings:

Fig. 1 is a cross sectional view taken through a clutch constructed in accordance with the invention, showing the same in released position and taken substantially on line 1—1 of Fig. 3.

Fig. 2 is a cross sectional view taken through the clutch showing the same in engaged position.

Fig. 3 is a rear view with some parts cut away and some parts in section.

Fig. 4 is a cross sectional view taken substantially on line 4—4 of Fig. 3.

Fig. 5 is a view illustrating one form of operating mechanism.

Fig. 6 is a view looking substantially on line 6—6 of Fig. 5.

Fig. 7 is a cross sectional view taken substantially on line 7—7 of Fig. 5 through the hub of the lever.

Fig. 8 is a detailed view of a control device for the lever.

The flywheel of an engine is illustrated at 1 and the clutch includes a cover plate 2. This cover plate is secured in driving relationship with the flywheel by studs or cap screws 3 and a coil spring 4 associated with each cap screw so that the cover plate may back away from the flywheel by spring compression.

A clutch pressure plate is illustrated at 5 and it is mounted in driving relationship with the flywheel and cover plate and so that it can shift axially. This mounting advantageously takes the form of flexible sheet metal plates 6, of which there are three in number as shown in Fig. 3, connected to the pressure plate as at 7 and to the cover plate as at 8. These plates hold the pressure plate centered and they are flexible for axial shift. As shown, the plates are slightly of corrugated form, or in other words, have a total dimension between the points 7 and 8 greater than the straight line dimension between these points to take care of the differential as the points 7 shift axially in a straight line relative to the points 8. However, the stock of the cover plate may be relied upon to flex sufficiently for this purpose.

A driven shaft is shown at 10 upon which a driven disc 11 is mounted, and the driven shaft may be piloted in the flywheel as shown at 12. The driven disc has clutch facings 13 preferably arranged so that they may be flexed toward and away from each other and normally held spaced apart as shown in Fig. 1.

The pressure plate may be provided with a machined surface 15 and the cover plate may have contact members 16 secured thereto. Centrifugal weights function between the pressure plate and cover plate and each weight may take the form of rollers mounted on pins as shown in Fig. 3. Two outside rollers 17 and 18 may be press fitted on to the pin 19 and an inner roller 20 of smaller diameter may be journaled on the pin through the means of a suitable bearing 21. Links 22 are swivelled on the pin and are pivoted as at 23 to a sleeve 26. The rollers 17 and 18 function on the surface 15 and the roller 20 functions on the contact member 16, the roller 20 being of smaller diameter. The member 16 is formed with a curved seat 24 which may be on the radius of the roller 20 and may have an inclined portion 25 merging into the seat 24 and on a tangent.

Spring means act upon the pressure plate and cover plate, and such a spring means is shown in Fig. 4. The spring is shown at 27 having one end secured to a holder 28 in turn fastened to the pressure plate and the other end fastened to a holder 29 secured to the cover plate by a cap screw 30. These springs are tension springs and serve to draw the pressure plate and the back wall of the cover plate toward each other. As shown in Fig. 3 there may be three centrifugal weight units alternately disposed relative to the flexible plates 6 with a spring 27 located in each space between a centrifugal weight unit and a flexible plate.

The sleeve 26 is slidably mounted upon the driven shaft as by means of bearings 31, and it carries two thrust bearings which are spaced axially relative to each other and are shown herein as in the form of carbon blocks 32 and 33 held in retainers 34 and 35, which retainers are mounted non-rotatably on the sleeve 26. A control ring or collar 37 surrounds the sleeve and is located between the thrust bearings and is pivotally connected to a control yoke 38 mounted on a control shaft 40.

The operation of this centrifugal clutch is as follows: When the engine and clutch are at rest or at idling speed of the engine, which may be somewhere in the vicinity of 600 or 650 R. P. M., depending upon the type of engine, the parts are in the position shown in Fig. 1. The springs 27 retract the pressure plate away from the flywheel so that the driven disc is released, and the rollers 20 are held seated in the recesses 24. As the engine and clutch are accelerated the centrifugal weight units shift outwardly. The rollers and their pins, and for that matter, the links 22, serve as centrifugal weight units. As the weights shift outwardly the rollers 20 ride up the ramps or inclines 25 and urge the pressure plate into engagement with the driven disc. First, the driven disc facings may be collapsed toward each other, and when the disc is collapsed, continued outward movement of the weights may cause the cover plate to back away from the flywheel against the action of the springs 4. In this action the sleeve 26 is caused to shift axially, and when the clutch is engaged the parts are in a position substantially as shown in Fig. 2. The links 22 tend to take a position at right angles to the driven shaft but they probably will not reach such a position. In any event, however, they arrive at an angularity relative to the driven shaft which is self-locking or in other words, at an angle of repose. When the engine and clutch are decelerated and even come to rest, the clutch stays engaged in the position shown in Fig. 2. The pull of the springs 27 will not retract the pressure plate since the links serve as struts to hold the roller units in their outward position. Therefore, once the clutch is fully engaged it will remain engaged and will even stall the engine and cause it to come to a complete rest. To disengage the clutch the operator may cause the control collar 37 to be shifted to the right as Fig. 2 is viewed, causing it to shift the sleeve 26 to the right to break the locking angle of the links so that the clutch may be disengaged. The operator is not required to completely disengage the clutch, as all he has to do is to shift the sleeve far enough to destroy the locking angle of the links, and from that point on the clutch disengages itself. The friction in the clutch is minimized due to the use of the relatively large rollers functioning between the cover plate and pressure plate with separate rollers of each unit functioning respectively on the pressure plate and cover plate.

The operator may also engage the clutch at will. Suppose it is desired to engage the clutch when the parts are at rest in order to start the engine by pushing or towing the vehicle. The operator causes the control collar to shift to the left as Fig. 1 is viewed, thus forcing the weight units into the position shown in Fig. 2 and engaging the clutch.

Therefore, it will be seen that the control collar is required to be moved in opposite directions to give the operator the desired control. One construction for accomplishing this is shown herein but is covered in a separate application. In this construction a clutch pedal 45 of a rather conventional type is rockably mounted on a shaft or stud 46, and it carries a pivotal latch 47 which may be shifted by means such as a Bowden wire 48 having a control button 49 conveniently located as for example on the instrument panel of the vehicle. Also pivotally mounted upon the stud or shaft 46 are two lever arms 50 and 51 notched as at 52 for the reception of detents 53 carried by the hub portion of the lever and acted upon by a spring 54. When the lever arms 50 and 51 are in alignment the detents are engaged as shown in Fig. 7. Each arm has a notch 55 adapted to receive the latch 47, depending upon the position of the latch as shown in Fig. 8. When the latch is shifted in one direction it engages in the notch of one arm and when it is shifted to its opposite position it engages in the notch of the other arm. The movements of the latch 47 may be limited by its engaging with the bottom surface 56 in a slot formed in the hub portion of the pedal 45. Thus the latch may form a driving connection between the pedal and either one of the arms.

On the clutch control shaft 40 and keyed thereto is a member having substantially oppositely extending arms 60 and 61, one of which is connected by a link 62 to arm 51 and the other of which is connected by a link 63 to the arm 50.

In the normal operation of this clutch the control will be arranged so that when the clutch pedal is depressed the collar 37 will be shifted to the right as Fig. 2 is viewed to release the clutch. At this time the latch 47 will be positioned so that it engages with the arm 51 and link 62. Therefore, any time the pedal is depressed the throw-out collar will be pulled in a direction to release the clutch.

Suppose the engine is operating at idling speed and that the clutch is disengaged; the operator may place the transmission into gear and then, upon acceleration, the clutch engages and the vehicle gets under way. In order to shift gears in the transmission the operator may release the clutch by pressing on the clutch pedal. This clutch is particularly advantageous for use in an automatic transmission. Again assume an idling condition with the clutch disengaged; as the engine is accelerated the clutch automatically engages and remains engaged while the automatic transmission is going through the different gear ratios. When the vehicle is to be brought to a stop or say, comes to rest at a traffic light, the operator may depress the pedal as the engine approaches idling speed just enough to break the irreversible angle of the links of the centrifugal units, and then the clutch disengages itself and remains disengaged until it automatically reengages upon acceleration.

Should it be desirable to have the clutch engaged while the vehicle is parked, it may be engaged in one of two ways. With the transmission in neutral the engine may be rotated fast enough to engage the clutch and then when the engine stops the transmission may be placed into a gear. The second way is by actuating the Bowden wire to shift the latch 47 to bring it into engagement with the lever arm 50 so that the operator may now depress the pedal and cause the collar 37 to shift to the left as Fig. 1 is viewed, and thereby shift the sleeve to the left to position the centrifugal units as shown in Fig. 2.

The clutch pedal may be returned to normal position by a retractor spring 65, and when it is returned to normal position the lever arms 50 and 51 come into alignment and are held in alignment by the detents 33. The latch 47 can only be actuated when the arms 50 and 51 are in alignment, and the arms are held in alignment by the detents. The centrifugal units are caused to rotate with the flywheel and cover plate by reason of the rollers 17 and 18 overlapping the edges of the members 16. The centrifugally acting parts, involving the three roller units, the central sleeve and the connecting links may be balanced as a unit and in operation all centrifugal forces are balanced out in these parts, to the end that the cover plate and flywheel are relieved of these forces. The cover plate, pressure plate and flywheel are subjected to axial forces, but the outward centrifugal forces cancel out in the sleeve 26.

As to the quietness of operation, the centrifugal weights do not have a sudden stop or bumping action as they come to their extreme outer or inner positions. When the weights move inwardly they ride into the recesses 24 and may then tend to roll up the incline positioned radially inwardly, with the result that the weights are stopped gradually as they move inwardly. As the weights move outwardly incident to centrifugal force their outward movement gradually decreases relative to a given movement axially of the sleeve 26, and therefore when the weights reach their outward maximum movement their inertia or momentum has been reduced practically to the zero point, much similar to the reversal of movement of a piston connected to a crank.

The centrifugal weight or weights and the spring or springs which act against or tend to resist movement of the centrifugal weights due to centrifugal force, are definitely coordinated with each other, particularly as to their rate of change of effectiveness during operation. As centrifugal weights shift outwardly during operation, the radii of the weights increase and the centrifugal force increases with this change of position. In other words the greater the radius for a given weight the greater the effectiveness of the centrifugal force at a given R. P. M. This is the rate of increase of the centrifugal weights referred to herein. As a spring is flexed its resistance to further flexing increases and this is the rate of spring increase referred to herein. The progressive increase of the resistance of the spring or springs to flexure is calculated to be at least equal to, and preferably greater than, the progressive increase of the effective centrifugal force of the weight or weights due to their change of position on increasing radii. By way of example, let a clutch be visualized in which, at a given R. P. M., say at idling speed of an engine, the springs overcome centrifugal force and hold the clutch disengaged. Upon acceleration the weights shift outwardly and their effectiveness increases due to the increasing radii, and the springs are flexed. The force exerted on the springs, due to the increased centrifugal force by reason of the change of position of the weights, is matched or balanced out, and is preferably exceeded by, the additional resistance of the springs to further flexure. Therefore, at this point an increase in the R. P. M. is necessary to continue the clutch engaging action.

This overcomes that characteristic in a centrifugal clutch which tends to cause the clutch to grab or quickly engage subsequent to the overcoming of the inertia of the centrifugal weights in initially imparting movement thereto and because of the progressive increase in centrifugal force due to the fact that the position of the weights changes with the increasing radii.

With reference to the clutch shown herein, this coordination involves the centrifugal weights and the retractor springs 27. This coordination need only exist until such time as the clutch is fully engaged in a non-slipping manner. As the weights shift outwardly in the action of engaging the clutch, their rate of increase is matched or exceeded by the rate of increase of the springs 27, and the clutch may be substantially completely engaged when the facings 13 are substantially completely collapsed toward each other. Thereafter, on further increase of R. P. M. the springs 4 are compressed, but these springs need not be so calculated. The springs 4 are primarily provided to take care of clutch facing wear. With new facings the springs 4 will be considerably compressed, but as the facings wear in use the springs 4 are compressed less and less. The idea is to have the links 22 always shift to a locking position which position will remain substantially the same throughout the life of the facings 13.

I claim:

1. A clutch comprising driving and driven members, means shiftable by centrifugal force to engage the clutch and movable incident to centrifugal force into a self-retained clutch engaged position for engaging the clutch upon acceleration and holding the clutch engaged when decelerated.

2. A clutch comprising driving and driven members normally disengaged at a predetermined relatively low R. P. M., and means shiftable by centrifugal force for engaging the clutch and movable into a self-retained clutch engaged position for engaging the clutch upon acceleration above said relatively low R. P. M. and for holding the clutch engaged upon deceleration to and below said relatively low R. P. M.

3. A clutch comprising driving and driven members normally disengaged at a predetermined relatively low R. P. M., means shiftable by centrifugal force for engaging the clutch and movable into a self-retained clutch engaged position for engaging the clutch upon acceleration above said relatively low R. P. M. and for holding the clutch engaged upon deceleration to and below said relatively low R. P. M., and manually controlled means operable at will for causing movement of said means out of said clutch engaged position.

4. A clutch comprising driving and driven members, centrifugal means for engaging the clutch, and means for automatically retaining the centrifugal means in clutch engaging position subsequent to centrifugal engagement of the clutch and in the absence of centrifugal force.

5. A clutch comprising driving and driven members, centrifugal means for engaging the clutch, means for automatically retaining the centrifugal means in clutch engaging position subsequent to centrifugal engagement of the clutch and in the absence of clutch engaging centrifugal force, and means subject to manual control at will for causing movement of the centrifugal means out of clutch engaging position whereby the clutch may be disengaged.

6. A clutch comprising driving and driven members, means for holding the clutch disengaged at a predetermined relatively low R. P. M., centrifugal means for engaging the clutch upon acceleration above said R. P. M., and means for holding the centrifugal means in clutch engaging position upon deceleration to an at rest condition.

7. A clutch comprising driving and driven members, means for holding the clutch disengaged at a predetermined relatively low R. P. M., centrifugal means for engaging the clutch upon acceleration above said R. P. M., means for holding the centrifugal means in clutch engaging position upon deceleration to said R. P. M., and means subject to manual control and effective upon said holding means for releasing the centrifugal means from engaged position for clutch disengagement.

8. A clutch comprising driving and driven members, means for holding the clutch disengaged at a predetermined relatively low R. P. M., centrifugal means for engaging the clutch upon acceleration above said R. P. M., means for holding the centrifugal means in clutch engaging position upon deceleration to said R. P. M., means subject to manual control and effective upon said holding means for releasing the centrifugal means from engaged position for clutch disengagement, and manually controlled means for engaging the clutch at said R. P. M. and while the clutch is at rest.

9. A clutch comprising driving and driven members, means for holding the clutch disengaged at a predetermined relatively low R. P. M., means shiftable by centrifugal force including pivotally connected parts and movable upon acceleration above said R. P. M. to engage the clutch, the pivoted parts assuming an angle of repose relative to each other when the clutch is engaged whereby to hold the clutch engaged upon deceleration to said relatively low R. P. M., and means operable at will for breaking the angle for clutch engagement.

10. A clutch comprising driving and driven members, means for holding the clutch disengaged at a predetermined relatively low R. P. M., weight members shiftable by centrifugal force to engage the clutch upon acceleration, a sleeve on the clutch axis freely shiftable axially, and links connecting the weight members and sleeve, said links shifting the sleeve axially incident to the outward movement of the weighted means by centrifugal force, the arrangement being that the links and sleeve assume a locking angle relative to each other for holding the clutch engaged upon deceleration to said relatively low R. P. M.

11. A clutch comprising driving and driven members, means for holding the clutch disengaged at a predetermined relatively low R. P. M., weight members shiftable by centrifugal force to engage the clutch upon acceleration, a sleeve on the clutch axis freely shiftable axially, links connecting the weight members and sleeve, said links shifting the sleeve axially incident to the outward movement of the weight means by centrifugal force, the arrangement being that the links and sleeve assume a locking angle relative to each other for holding the clutch engaged upon deceleration to said relatively low R. P. M., and means operable at will for shifting the sleeve axially to break the irreversible angle for clutch release.

12. A clutch comprising driving and driven members, means for holding the clutch disengaged at a predetermined relatively low R. P. M., weight members shiftable by centrifugal force to engage the clutch upon acceleration, a sleeve on the clutch axis freely shiftable axially, links connecting the weight members and sleeve, said links shifting the sleeve axially incident to the outward movement of the weight means by centrifugal force, the arrangement being that the links and sleeve assume a locking angle relative to each other for holding the clutch engaged upon deceleration to said relatively low R. P. M., means operable at will for shifting the sleeve axially to break the irreversible angle for clutch release, and means operable at will for shifting the sleeve in the opposite direction to cause clutch engagement independent of centrifugal force.

13. A clutch comprising a flywheel, a cover plate, means securing the cover plate to the flywheel including springs so that the cover plate may back away from the flywheel by spring flexure, an axially shiftable pressure plate connected in driving relation with the cover plate and flywheel, a driven disc positioned between the flywheel and pressure plate, spring means interconnecting the pressure plate and cover plate and serving to retract the pressure plate away from the driven member, said pressure plate and cover plate having relatively inclined surfaces and centrifugally controlled members between the pressure plate and cover plate functioning on said surfaces and shiftable by centrifugal force to shift the pressure plate axially into engagement with the driven member against the action of the spring means between the cover plate and pressure plate and with the reaction to the shift of the pressure plate taken by the springs included in the cover plate mounting.

14. A clutch comprising driving and driven members, a plurality of centrifugal units shiftable to engage the clutch by centrifugal force at an R. P. M. above a predetermined relatively low R. P. M., an axially positioned sleeve, links interconnecting the centrifugal units and sleeve whereby the sleeve shifts axially upon movement of the centrifugal units, said sleeve moving in one direction upon clutch engaging action whereby the links assume an irreversible angle with respect to the sleeve to hold the clutch engaged; in combination with clutch control means effective on the sleeve and operable to shift the sleeve in a direction opposite the said one direction to break the irreversible angle for clutch disengagement and operable to shift the sleeve in the first direction for clutch engagement independently of centrifugal force.

15. A clutch comprising driving and driven members, spring means for holding the clutch disengaged at a predetermined relatively low R. P. M., centrifugal means shiftable by centrifugal force upon acceleration above said relatively low R. P. M. to engage the clutch and movable into a self-retained clutch engaged position, said centrifugal means including weights, an axially shiftable member and links connecting the member and centrifugal weights, manually operable means shiftable at will for shifting the member in one direction to release the centrifugal means from the self-retaining position so that the spring means may automatically disengage the clutch at and below said R. P. M., and operable to shift said member in the opposite direction to engage the clutch independently of centrifugal force.

16. A clutch comprising driving and driven members, spring means for holding the clutch disengaged at a predetermined relatively low R. P. M., weight means shiftable radially outwardly by centrifugal force upon acceleration above said R. P. M. for engaging the clutch by centrifugal force against the action of said spring means, the resistance of the spring means progressively increasing upon flexure at a rate greater than the rate of increase of centrifugal force due to the increase of the radius of the weights.

17. A clutch comprising driving and driven members, spring means for holding the clutch disengaged at a predetermined, relatively low R. P. M., weight means shiftable radially outwardly by centrifugal force upon acceleration above said R. P. M. for engaging the clutch by centrifugal force against the action of said spring means, the rate of the increase of the resistance of the spring means due to flexure being substantially matched with the rate of increase of centrifugal force due to the increase of the radius of the weights as they shift radially outwardly.

18. A clutch comprising driving and driven members, weight means shiftable radially outwardly by centrifugal force for engaging the clutch, and spring means flexed by the outward shift of the weight means and reacting against the outward shift of the weight means, the rate of increase of the resistance of the spring means upon flexure being substantially matched to the rate of increase of the centrifugal force of the weight means incident to the increase of the radius of the weight means.

19. A clutch comprising driving and driven members, weight means shiftable radially outwardly by centrifugal force for engaging the clutch, and spring means flexed by the outward shift of the weight means and reacting against the outward shift of the weight means, the rate of increase of the resistance of the spring means upon flexure being in excess of the rate of the increase of centrifugal force due to increase of the radius of the weights as they shift outwardly.

ERNEST E. WEMP.